P. ARNOLD.
COFFIN.
APPLICATION FILED FEB. 5, 1912.
1,143,018. Patented June 15, 1915.
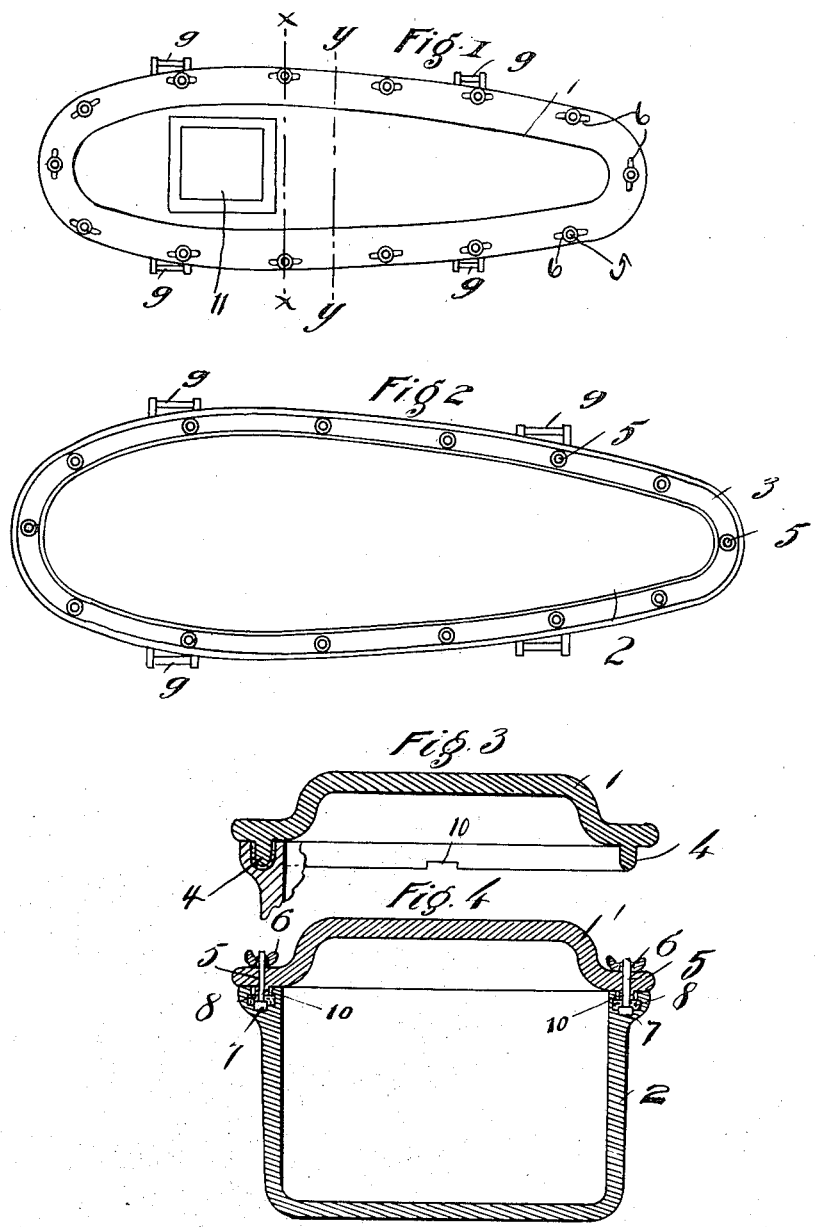
Witnesses
L. T. Knight
A. P. Horner
Inventor
Price Arnold,
By A. L. Jackson,
Attorney

UNITED STATES PATENT OFFICE.

PRICE ARNOLD, OF FORT WORTH, TEXAS.

COFFIN.

1,143,018.  Specification of Letters Patent.  Patented June 15, 1915.

Application filed February 5, 1912. Serial No. 675,558.

*To all whom it may concern:*

Be it known that I, PRICE ARNOLD, a citizen of the United States, residing at Fort Worth, in the county of Tarrant and State of Texas, have invented certain new and useful Improvements in Coffins, of which the following is a specification.

My invention relates to coffins, and the object is to provide coffins, caskets, vaults, and similar structures which are made of baked and burned clay, and which can be hermetically sealed and which will remain sealed indefinitely.

The object in construction is to provide a receptacle which is made of a single piece of material and a top which is made of a single piece of material and to fit the two parts together and cement the same rigidly so that the receptacle will be air-tight.

Another object is to provide such device in a form which is light and very strong. Other objects and advantages will be fully explained in the following description and the invention will be more particularly pointed out in the claim.

Reference is had to the accompanying drawings which form a part of this application.

Figure 1 is a plan view of a coffin constructed according to my invention. Fig. 2 is a plan view with the lid removed. Fig. 3 is a section of the lid, taken on the line *y—y* of Fig. 1. Fig. 4 is an enlarged section, taken on the line *x—x* of Fig. 1.

Similar characters of reference are used to indicate the same parts throughout the several views.

The coffin has a lid 1 and a receptacle 2. The rim of the receptacle has a groove 3 and the lid 1 has a rib 4 on the lower side which is received into the groove 3, the rib 4 being somewhat smaller than the groove 3 so that cement or other sealing composition can be placed in the groove before the rib 4 is pressed therein. When the rib 4 is pressed down in the groove 3 the cement or other sealing composition will be pressed up between the rib 4 and the walls of the groove 3 and thus make an air-tight closure. The lid 1 may be further secured on the receptacle by bolts 5 and nuts 6. A cavity 8 is formed in the groove 3. The bolts 5 have heads 7 and the bolts can be fixed in the cavities 8 prior to the sealing of the lid on the coffin. The cavity 8 is larger in width than the groove 3. The heads 7 are placed in the bottom of the cavity and a sealing composition, such as cement is placed in the cavity embedding the heads 7. Lead can be used for fixing the heads 7 in the cavity. If lead is used, it is poured in the cavity about the heads in a melted condition. When cooled, the lead will hold the heads securely in place. If cement or other plastic is used, the heads will be securely fixed when the material has been set, or dried. The part of the rib 4 through which a bolt is to project is cut away slightly as shown at 10 for the purpose of fixing the bolts rigidly in the rim of the coffin. The lid is placed on the coffin with the bolts 5 projecting up therethrough. The lid is then further secured in place by nuts 6. The lid may be provided with a glass or transparent plate 11, the edges of which can be embedded in cement to make an air-tight closure.

Having fully described my invention, what I claim, is,—

A coffin made of burned clay and consisting of a receptacle having an enlarged rim and a groove in said rim and cavities formed in said rim at the bottom of said groove wider than said groove, a lid having a rib projecting downwardly from the rim thereof into said groove and being narrower than said groove, cement binding said rib in said groove, said rib being cut away adjacent to said cavities, bolts having heads in said cavities and projecting through said ribs in said cut outs, means fixing said heads in said cavities, and nuts for said bolts.

In testimony whereof, I set my hand in the presence of two witnesses, this 29th day of January, 1912.

PRICE ARNOLD.

Witnesses:
L. T. KNIGHT,
A. L. JACKSON.